Oct. 25, 1960 CARL-ERIK GRANQVIST 2,957,984
TUNABLE CIRCUIT, PARTICULARLY FOR HIGH FREQUENCIES
Filed Feb. 21, 1958
FIG. 1, FIG. 2, FIG. 3
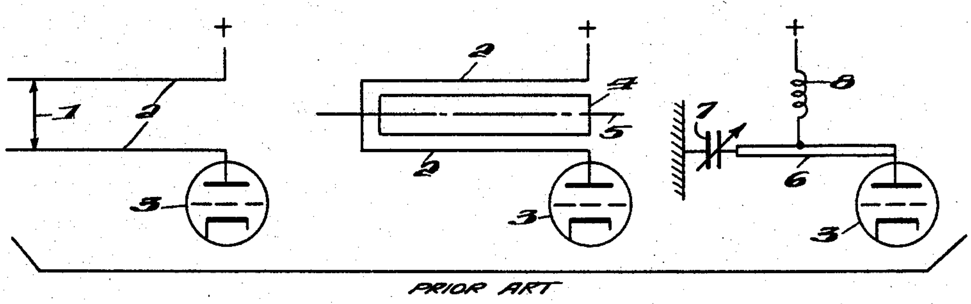
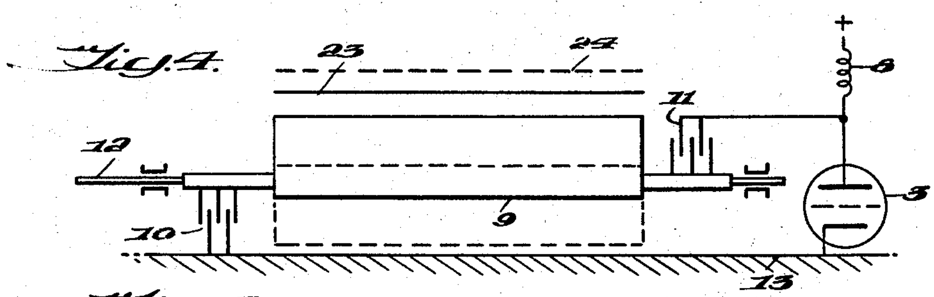
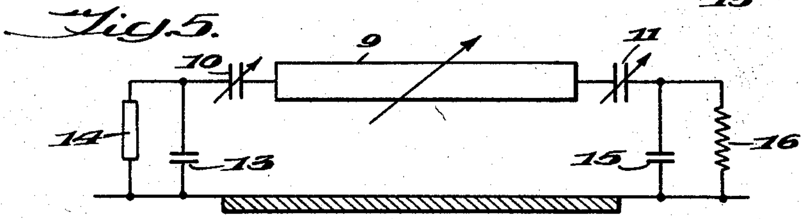
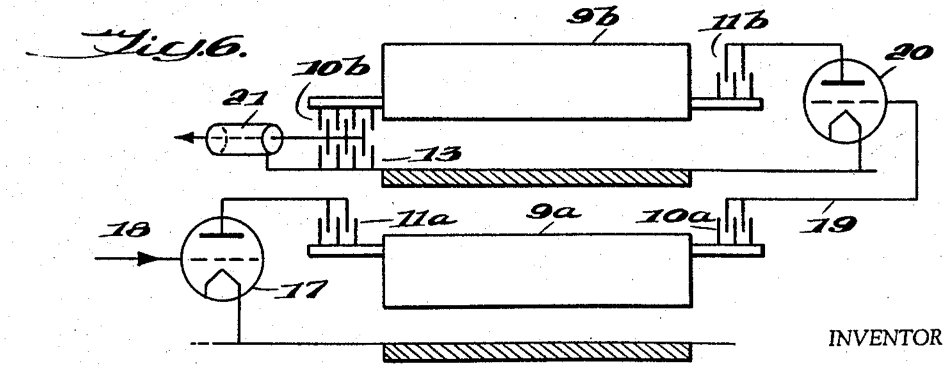
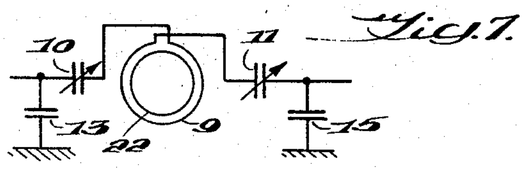
INVENTOR
CARL-ERIK GRANQUIST,
BY Larson and Taylor
ATTORNEYS United States Patent Office 2,957,984 Patented Oct. 25, 1960

2,957,984

TUNABLE CIRCUIT, PARTICULARLY FOR HIGH FREQUENCIES

Carl-Erik Granqvist, Lidingo, Sweden, assignor to Svenska Aktiebolaget Gasaccumulator, Lidingo, Sweden, a corporation of Sweden Filed Feb. 21, 1958, Ser. No. 716,613

Claims priority, application Sweden Feb. 22, 1957

3 Claims. (Cl. 250—40)

Conventional condenser tuned tank circuits cannot be used at high frequencies for the reason that the efficiency is exceedingly low as soon as the circuit capacitances are changed to a higher value. On the assumption that the circuits own Q is compatible with an impedance higher than the suitable load for the tube anode circuit, the following expression is valid for the efficiency of the tank circuit:

$$\eta = 1 - \frac{2\pi f \cdot C \cdot R}{Q}$$

In this expression, $\eta$ designates the tank circuit efficiency, $f$ the resonance frequency of the circuit, C the tank circuit capacitance, R a suitable load for the tube anode circuit and Q the Q of the tank circuit itself.

If this expression is used for a calculation of the efficiency of the tank circuit which is condenser tuned to cover a frequency band of 200 to 400 mc./s., it is found that the tank efficiency at 400 mc./s. is about 90% if the minimum capacitance is 5 pf. At 200 mc./s. the capacitance is four times this value, which means that the efficiency has decreased as much as to 75%.

In order for the tank circuit efficiency to be as high as possible, an amplifying tube should be selected having a small anode-cathode capacitance and anode resistance. The latter condition implies that a tube should be chosen which operates at high current and low voltage. However, if the voltage across the tube of an ultra high frequency amplifying stage is increased, the optimum loading resistance increases as a rule and the efficiency therefore goes down, which means that the power output will not increase with an increase in voltage. The expression for the efficiency given above shows that a high efficiency can also be reached through a high circuit Q, but this has the disadvantage that the circuit will have low stability. High Q's therefore have to be avoided.

On the attached drawing, Figs. 1–3 show some prior devices for tuning a tank circuit. Fig. 1 shows a typical arrangement for inductive tuning in which a shorting bridge 1 is displaced along a line 2, which is connected between a voltage source + and the anode of a tube 3. This arrangement admits of a high efficiency but gives rise to difficulties at the sliding contacts, since current maxima occur at these contacts. Moreover, the arrangements for coupling the circuit to a load or to a second tube become complicated, since a coupling loop used for this purpose and which has to be passed through by the shorting bridge has to be made displaceable together with the shorting bridge and should in addition be of variable magnitude for different resonant frequencies. The required mechanism for displacing the shorting bridge also becomes expensive and complicated. Furthermore, it is only with great difficulty that the arrangement can be constructed to have a linear frequency scale.

Fig. 2 shows a second modification of the inductive tuning, in which a short circuiting plate 4 is turnable on an axis 5 in the magnetic field of the line 2, the latter being as before connected between a voltage source + and the anode of a tube 3. This arrangement however is characterized by a very low Q at the highest frequency within a reasonably broad frequency band.

Fig. 3 shows a circuit arrangement which is often used in ultra high frequency tuning units for television apparatus. In this arrangement, the tuning circuit comprises a line 6 which is connected in series with a variable condenser 7 between ground and the anode of the tube 3. The high voltage is applied to the tuning circuit and the tube from a voltage source + through a choke 8 at a point on the line 6. This arrangement has the drawback that the minimum condenser capacitance becomes very small if a large tuning range is to be obtained, therefore the use of the arrangement is made impossible in high power applications owing to the high voltages then occurring across the condenser. In this circuit there is furthermore a flow at high frequency through the journallings of the variable condenser, which may cause corresponding contact trouble. Finally the connection of the circuit to a load is difficult, since a coupling loop used for the connection must be located at a point of maximum current on the line and has to be displaceable so as to move with the current maximum as it moves along the line with different tunings.

The disadvantages of the prior arrangements are obviated according to the present invention in a tunable circuit comprising a line of variable surge impedance or inductance and connected in series with condensers, at least one of which is variable. In such a tunable circuit, variation of the resonance frequency is obtained through simultaneous variation of the condenser capacitance and the line surge impedance or inductance.

On the annexed drawing, Fig. 4 shows a tunable circuit constructed according to the invention, Fig. 5 is a diagram showing the connection of the circuit to a load, Fig. 6 shows an arrangement comprising two cascaded amplifying stages having tunable circuits according to the invention, and Fig. 7 shows a modification of the invention.

The Fig. 4 arrangement comprises an electron tube 3, the anode of which is connected to a high voltage source + via a high frequency choke 8. Between the anode and ground the tunable circuit is connected and comprises a line 9 of variable surge impedance, which is connected in series with two condensers 10 and 11, of which the condenser 10 is connected between the line 9 and ground and the condenser 11 between the line 9 and the anode. The variation of the line surge impedance can be obtained in any way and, in the Fig. 4 embodiment, this is done by having the line journalled eccentrically with respect to an axis of rotation 12 which is parallel with the ground plate 13. The movable plates of the two condensers 10 and 11 are joined to this axle, whereas the fixed plates of the condenser 10 are connected to the ground plate 13 and those of the condenser 11 to the anode of the tube 3. Owing to the rotation of the inductive element, i.e. the line, simultaneously with that of the movable condenser plates, no high frequency current flows through the journallings and the problems caused by such current are not present.

Upon rotation of the elements on the axis of rotation 12, the resonance frequency of the tunable circuit is varied by simultaneous variation of the capacitances of the condensers 10 and 11 and of the surge impedance of the line 9. This arrangement provides a large tuning range with reasonable variations of the condenser capacitances as well as the line surge impedance. This causes the voltages across the variable capacitances to be reasonably low and the minimum Q of the line comparatively high, so that a large tuning range can be obtained at good efficiency. To obviate excessively small capacitances in the circuit, the capacitance variations of the condenser 10 may be made substantially larger than those of the condenser 11.

In the Fig. 4 arrangement, if $X_1$ designates the reactance of the condenser 10, $X_a$ the reactance of the series connection of the tube 3 and the condenser 11, $Z_0$ the line surge impedance, $\alpha$ the line propagation constant and S the length of the line, and on the assumption that the line resistance and conductance are low, the following expression is obtained, from which the length of the line can be computed:

$$X_1=\frac{X_a+Z_0\cdot \mathrm{tg}\ \alpha s}{Z_0+X_a\cdot \mathrm{tg}\ \alpha s}\cdot Z_0$$

If it is assumed, for instance, that the minimum capacitance of the condenser 10 and of the series connection of the condenser 11 and the anode-cathode capacitance of the tube 3 be about 4 pf. and that the line surge impedance at 400 mc./s. is about 50 ohms, this expression yields a length of the line of about 27 centimeters.

Fig. 5 shows a suitable manner of connecting a load to a tank circuit according to the invention. As shown, there is connected between the condenser 10 and ground a bottom coupling condenser 13, which is in its turn in parallel with the load 14. In this figure, the tube 3 is represented by its anode-cathode capacitance 15 and its interior resistance 16. If this interior resistance is designated $R_a$, the anode-cathode capacitance $C_a$, the load 14 as $R_b$ and the capacitance of the coupling condenser 13 as $C_b$, the following simple relationship between these magnitudes is valid at high frequencies:

$$\frac{C_b}{C_a}=\sqrt{\frac{R_a}{R_b}}$$

With the aid of this expression, the magnitude of the coupling condenser 13 can, for instance, be computed to about 50 pf., if a load of 50 ohms is to be connected to the tank circuit and the suitable anode load for the tube is about 5000 ohms and tis anode-cathode capacitance about 5 pf.

A frequency multiplying arrangement comprising a tunable circuit according to the invention is shown in Fig. 6. This arrangement comprises a first amplifying tube 17, to the grid of which is applied an oscillation of frequency *f* via a conductor 18. In the output circuit of this tube is connected a tunable circuit comprising a condenser 11*a*, a line 9*a* of variable surge impedance and a condenser 10*a*. This circuit is assumed to be tuned to a frequency of 3*f*, so that a frequency tripling is obtained in this stage. Through a conductor 19 the oscillation of this new frequency is applied to the grid of a second tube 20, which has in its output circuit a tunable circuit 11*b*, 9*b*, 10*b*, which may be assumed to be tuned to the frequency 9*f*. A load not shown in the drawing is assumed to be connected via a coaxial cable 21 to the coupling condenser 13, which is assumed in this embodiment to form a unit with the condenser 10*b*. This arrangement is very simple, since no coupling loops of any kind have to be used and the voltage distribution between the anode circuit and the following grid circuit will be in direct proportion to the ratio of the corresponding capacitances.

At lower frequencies, such as of the order of 100 mc./s., a line of the type hitherto described will be inconveniently large and it can then be constructed in the form of a loop as illustrated in Fig. 7. In this arrangement a circular line 9 is connected between the condensers 10 and 11, a fixed plate 22 located within the loop serving as a ground plate. The loop 9 is assumed to be rotatable with respect to the plate 22, thereby enabling a variation of the surge impedance of the line formed by the loop. It is also possible to arrange the loop fixed and the plate turnable, which gives the same effect.

As a rule, a linear relationship is desired between the angle of rotation with regard to the tuning axis and the frequency. This may be achieved in a simple manner through a suitable mechanical shaping of the plates of the variable condensers and of the cross section of the variable line.

Through the provision of capacitive screws, i.e. screws connected with one plate of the condenser and whose distance to the other plate is variable along the angle of rotation of the condenser plates it is further possible to trim the frequencies at different angular positions, so that there is no difficulty connected with the trimming of the various amplifying stages that may be desired. Furthermore, similar screws may be placed along the variable line, whereby a fine adjustment of the line surge impedance for different rotational positions is possible.

For remote control of the frequency of a radio transmitter or receiver it is often desirable to use a decade system comprising coarse and fine stages. In a tunable circuit according to the invention, coarse stages can easily be obtained through a rotation of the line axis and fine stages through a minor adjustment of the line surge impedance. In order to provide this fine adjustment for the same frequency scope at the highest and at the lowest frequencies, a movable plate is located on the opposite side of the line with regard to the ground plate. Fig. 4 shows an example of such a plate, the full-drawn line 23 indicating one position thereof and the dash line 24 indicating a different position. Through the described arrangement of the movable plate, one and the same displacement thereof is made to cause a larger change percentage-wise in the line surge impedance at lower frequencies than at higher frequencies. It is furthermore possible to construct the earth plate in such a way that its distance from the axis of the line rotation is adjustable within different portions of the earth plate. The latter may be made, for instance, of soft plate, the distance of which to said axis of rotation is adjustable by means of screws. In this manner, trimming of the frequency of the whole circuit can be obtained at a number of points. For a complete tuning system it is suitable to use the ground plate screws for coarse trimming and to arrange a number of small screws along the periphery of the variable condenser as capacitive screws to provide fine trimming.

In the description hitherto given of the tunable circuit, it was assumed that both of the condensers 10 and 11 are variable. It may however suffice to have only one of them variable and the other fixed. To prevent high frequency currents from passing through the line suspending journallings, as in the foregoing cases, it is suitable to arrange one plate of the fixed condenser on the axis of rotation of the line, the opposite plate of this condenser extending angularly around the axis of rotation, making the capacitance of this condenser constant and independent of the turning angle of the line.

What is claimed is:

1. A tunable circuit for high frequencies having a single input and a single output comprising a pair of condensers, each having a fixed element and a movable element rotatable about an axis, a line electrically and mechanically connected between the movable elements of said condensers and rotatable therewith, said line being eccentrically mounted with respect to said axis and parallel to a ground plate, means connecting said ground plate to the fixed element of one of said condensers, a single input for connection to a signal source including means for applying a signal to the fixed element of one of said condensers, and a single output for connection to a load including means for connecting a load to the fixed element of the other of said condensers, whereby a signal may be applied to said line only through the fixed elements of said condensers.

2. A tunable circuit as claimed in claim 1 wherein one of said condensers is connected in series with a fixed condenser across which a load is connected.

3. A tunable circuit as claimed in claim 1 wherein the position of said ground plate is adjustable with respect to said line.

References Cited in the file of this patent

UNITED STATES PATENTS

| | | |
|---|---|---|
| 2,052,316 | Sagle | Aug. 25, 1936 |
| 2,540,137 | Page | Feb. 6, 1951 |
| 2,560,685 | Cooper | July 17, 1951 |
| 2,719,273 | Rambo | Sept. 27, 1955 |